US010704793B2

(12) United States Patent
Bassick

(10) Patent No.: US 10,704,793 B2
(45) Date of Patent: Jul. 7, 2020

(54) CABIN AIR DESICCANT DEHUMIDIFIER

(71) Applicant: DENSO International America, Inc., Southfield, MI (US)

(72) Inventor: Peter Bassick, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 100 days.

(21) Appl. No.: 16/032,709

(22) Filed: Jul. 11, 2018

(65) Prior Publication Data

US 2020/0018496 A1    Jan. 16, 2020

(51) Int. Cl.
*F24F 3/14* (2006.01)
*B60H 3/02* (2006.01)
*B60H 1/00* (2006.01)

(52) U.S. Cl.
CPC ........... *F24F 3/1423* (2013.01); *B60H 3/024* (2013.01); *B60H 2003/028* (2013.01); *F24F 2003/1458* (2013.01)

(58) Field of Classification Search
CPC ............ F24F 3/1423; F24F 2003/1458; F24F 3/1411; F24F 3/1417; B60H 3/024; B60H 2003/028
USPC ........................................................ 62/272
See application file for complete search history.

(56) References Cited

U.S. PATENT DOCUMENTS

| 5,514,035 A | 5/1996 | Denniston | |
|---|---|---|---|
| 5,560,217 A * | 10/1996 | Takahashi | .......... B60H 1/00392 62/200 |
| 5,931,015 A * | 8/1999 | Maeda | ................... F24F 3/1423 62/271 |
| 6,672,085 B1 * | 1/2004 | Sangwan | ............... B60H 1/008 62/126 |
| 2007/0144350 A1 | 6/2007 | Paling | |
| 2010/0281904 A1 | 11/2010 | Yokomachi et al. | |
| 2014/0190658 A1 * | 7/2014 | Park | ....................... B60H 3/024 165/8 |

FOREIGN PATENT DOCUMENTS

JP          02197733 A  *  8/1990  ............ F24F 3/1423

OTHER PUBLICATIONS

Awaji, Yasuyuki, Aug. 1990, JP-02197733-A, European Patent Office English Translation (Year: 1990).*

* cited by examiner

*Primary Examiner* — Steve S Tanenbaum
(74) *Attorney, Agent, or Firm* — Harness, Dickey & Pierce, P.L.C.

(57) ABSTRACT

A blower case for a heating, ventilation, and air conditioning (HVAC) system. The blower case includes an inlet for airflow entering the blower case. Also included is a dehumidifier, which is movable between a first position and a second position. In the first position the dehumidifier is in a path of airflow entering the blower case through the inlet. In the second position the dehumidifier is not in the path of airflow entering the blower case through the inlet.

20 Claims, 2 Drawing Sheets

CABIN AIR DESICCANT DEHUMIDIFIER

FIELD

The present disclosure relates to a dehumidifier for dehumidifying cabin air of a vehicle.

BACKGROUND

This section provides background information related to the present disclosure, which is not necessarily prior art.

When the temperature is cold, it is desirable to heat the passenger cabin of a vehicle as quickly as possible to improve passenger comfort. Current vehicle heating, ventilation, and air conditioning (HVAC) systems draw airflow from the outside environment surrounding the vehicle into the HVAC system and heat the airflow using heat generated by the engine. The airflow is then introduced into the passenger cabin to heat the passenger cabin.

While current HVAC systems are suitable for their intended use, they are subject to improvement. For example, heating cold external airflow requires more than an insignificant period of time, which results in the occupants having to endure a cold passenger cabin until the engine reaches a temperature that is warm enough to expeditiously heat the external airflow. HVAC systems that recirculate the relatively warmer airflow of the passenger cabin through the HVAC system in place of the external airflow in order to expedite heating of the passenger cabin have been contemplated, but have failed because the cabin air has a relatively high humidity that causes the windshield and windows of the vehicle to fog. The present disclosure advantageously provides for an improved HVAC system that addresses these shortcomings of the art, and thus is able to heat recirculated passenger cabin airflow during a cold engine start to improve passenger cabin warmup time without fogging the windshield or windows of the passenger cabin. The present disclosure provides numerous additional advantages and unexpected results as explained in detail herein, and as one skilled in the art will appreciate.

SUMMARY

This section provides a general summary of the disclosure, and is not a comprehensive disclosure of its full scope or all of its features.

The present disclosure includes a blower case for a heating, ventilation, and air conditioning (HVAC) system. The blower case includes an inlet for airflow entering the blower case. Also included is a dehumidifier, which is movable between a first position and a second position. In the first position, the dehumidifier is in a path of airflow entering the blower case through the inlet. In the second position, the dehumidifier is not in the path of airflow entering the blower case through the inlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
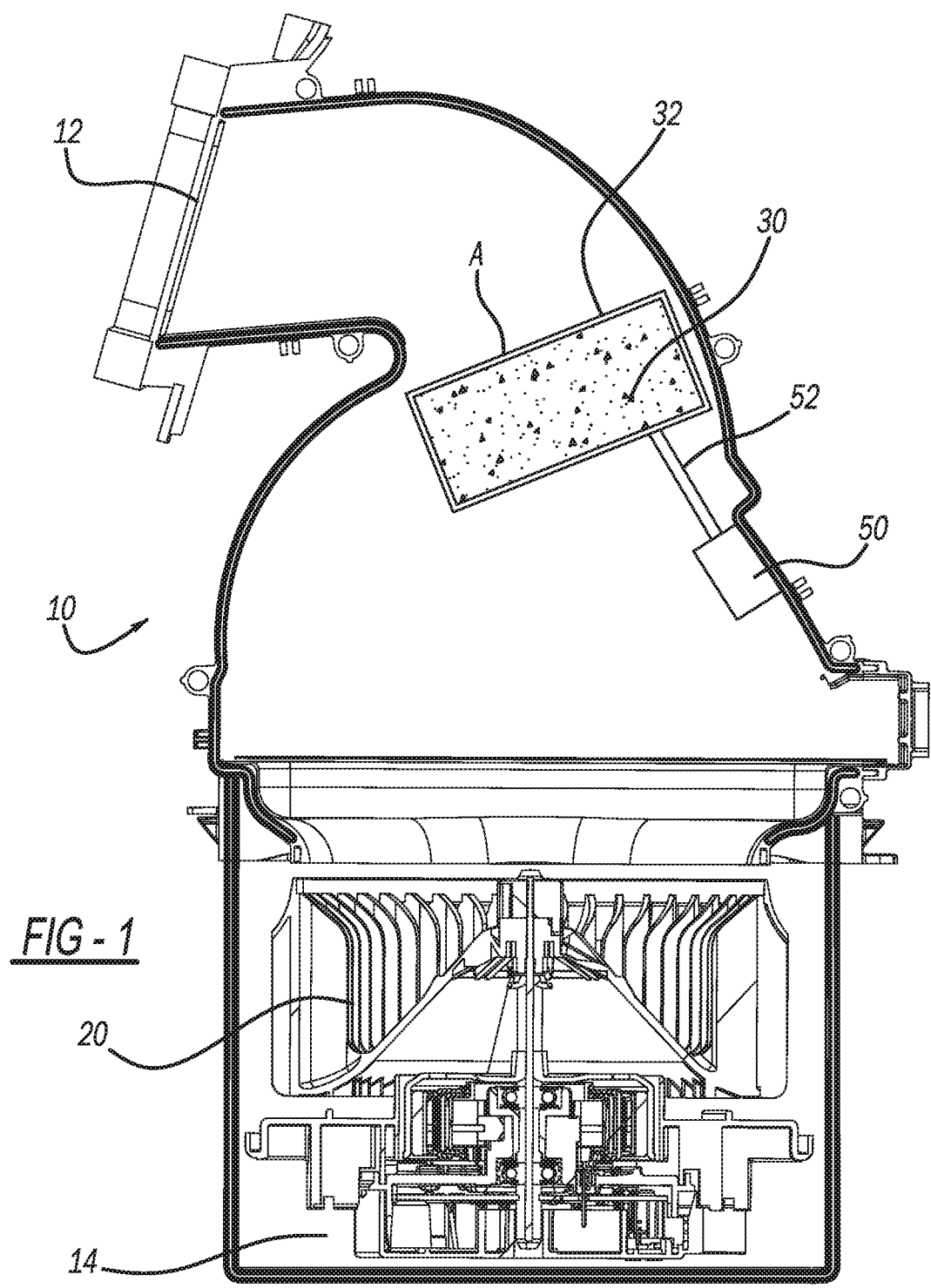
Figure 2:
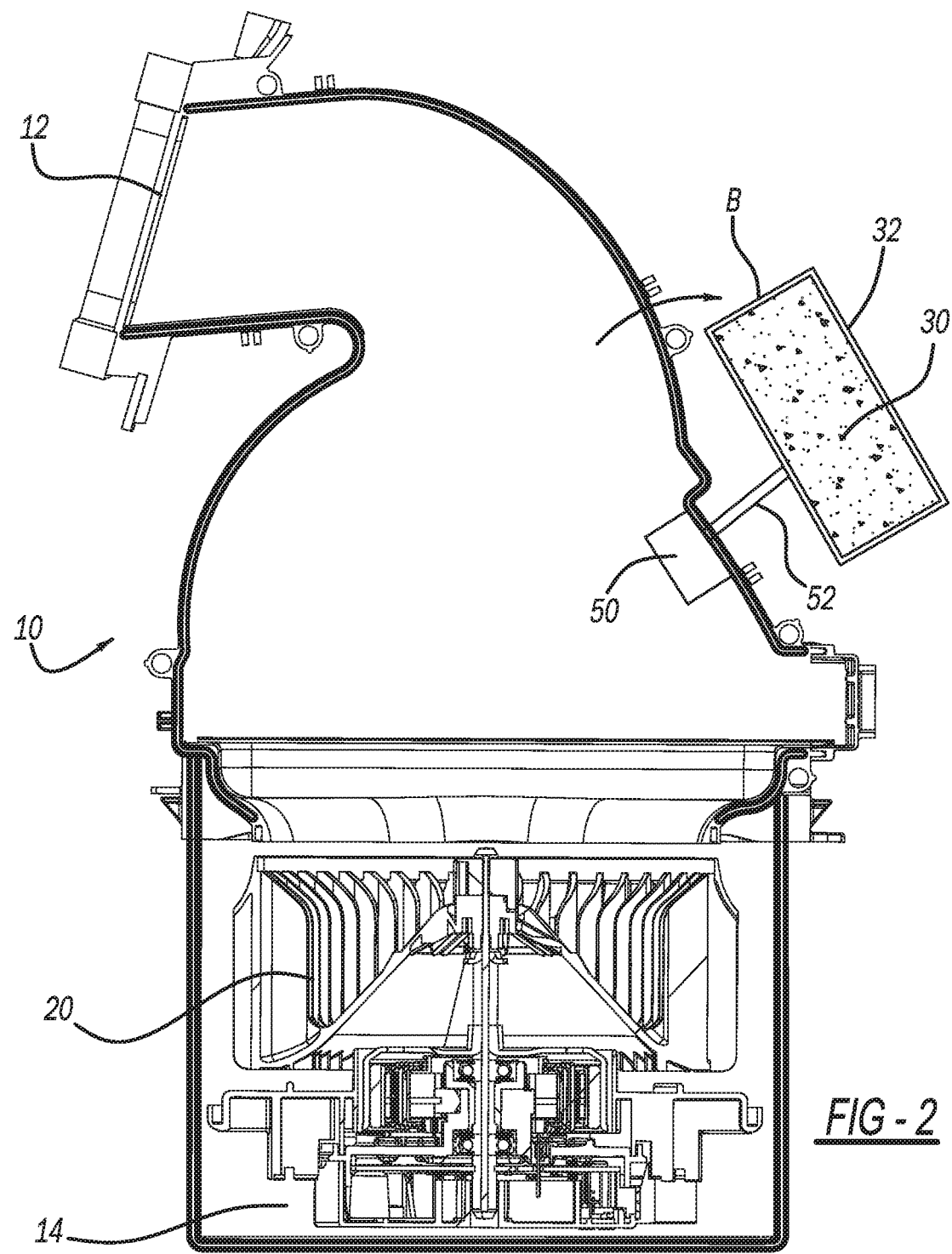

FIG. 1 illustrates a blower case of a heating, ventilation, and air conditioning (HVAC) system, the blower case including a dehumidifier (such as a desiccant) for dehumidifying cabin air of a vehicle, the dehumidifier arranged in a first position in which the dehumidifier is in a path of airflow entering the blower case through an inlet; and FIG. 2 illustrates the blower case of FIG. 1 moved from the first position to a second position in which the dehumidifier is not in the path of airflow entering the blower case through the inlet.

Corresponding reference numerals indicate corresponding parts throughout the several views of the drawings.

DETAILED DESCRIPTION

Example embodiments will now be described more fully with reference to the accompanying drawings.

As illustrated in FIGS. 1 and 2, the present disclosure includes a blower case 10 for a heating, ventilation, and air conditioning (HVAC) system for regulating temperature of a passenger cabin of a vehicle. The vehicle may be any suitable vehicle, such as any suitable passenger vehicle, utility vehicle, mass transit vehicle, construction vehicle/equipment, military vehicle/equipment, aircraft, watercraft, etc. The blower case 10 defines an inlet 12 and an outlet 14. The inlet 12 receives airflow from the passenger cabin of the vehicle. Airflow that has entered through the inlet 12 exits the blower case 10 through the outlet 14, and returns to the passenger cabin from the outlet 14. The blower case 10 includes a blower 20. The blower 20 draws airflow from the passenger cabin into the blower case 10 through the inlet 12, circulates the airflow through the blower case 10 and the HVAC system generally, and blows the airflow out through the outlet 14 and back to the passenger cabin.

The blower case 10 further includes a dehumidifier 30 that dehumidifies the passenger cabin airflow that enters the blower case 10 through the inlet 12. The dehumidifier 30 can be any suitable dehumidifier. For example, the dehumidifier 30 may include any suitable desiccant. The dehumidifier 30, such as the desiccant, is within any suitable container 32. In some applications, the container 32 may include or be any suitable filter.

The container 32 is mounted within the blower case 10 such that the container 32 and the dehumidifier 30 thereof is movable between a first position A (FIG. 1) and a second position B (FIG. 2). In the first position A, the container 32 is arranged such that the dehumidifier 30 is within the airflow entering the inlet 12 in order to dehumidify the airflow. For example, the container 32 and the dehumidifier 30 may be at the inlet 12. In the second position B, the container 32 and the dehumidifier 30 are moved such that the dehumidifier 30 is not in the path of airflow entering the blower case 10 through the inlet 12.

The container 32 and the dehumidifier 30 may be moved between the first position A and the second position B with any suitable actuator 50. For example, the actuator 50 may include or be a servo. The actuator 50 is connected to the container 32 by any suitable linkage 52. The linkage 52 may be any suitable arm and pin linkage, for example. The actuator 50 may be mounted to the blower case 10. Alternatively, the actuator 50 may be mounted to any other suitable portion of the HVAC system that the blower case 10 is used with.

When the vehicle is started and the external temperature is cold (below a predetermined temperature), the HVAC system associated with the blower case 10 is configured to block external airflow from entering the blower case 10. In place of the external airflow, airflow of the passenger cabin is recirculated through the blower case 10 through the inlet 12 and the outlet 14 by the blower 20. Because the airflow of the passenger cabin will typically be relatively warmer than the external airflow, heating the airflow of the passenger cabin will take less time and energy as compared to heating the colder external airflow.

Because the airflow of the passenger cabin will typically have a relatively high humidity compared to the external air, a controller of the HVAC system will operate the actuator 50 to position the dehumidifier 30 at the first position A of FIG. 1 in order to dehumidify the airflow from the passenger cabin. Lowering the humidly of the airflow from the passenger cabin will advantageously eliminate, or reduce the possibility of, windshield fogging. Once the humidity of the passenger cabin is reduced to a predetermined acceptable level (and/or the temperature of the passenger cabin is heated above a predetermined threshold) the HVAC controller will operate the actuator 50 to move the dehumidifier 30 to the second position B of FIG. 2 at which the dehumidifier 30 is no longer exposed to airflow from the passenger cabin. Moving the dehumidifier 30 to the second position B advantageously prevents the dehumidifier 30 from becoming saturated and undesirably humidifying the passenger cabin airflow.

The present disclosure thus provides numerous advantages over the art. For example, heating the air of the passenger cabin instead of external air drawn into the blower case 10 reduces warmup time and/or requires less energy input to the blower 20 (and consequently the engine off which the blower 20 runs), which in turn improves fuel economy. One skilled in the art will appreciate that the present disclosure provides numerous additional advantages as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A blower assembly for a heating, ventilation, and air conditioning (HVAC) system, the blower assembly comprising:
   a blower case defining an inlet for airflow entering the blower case and an outlet for airflow exiting the blower case;
   a blower within the blower case between the inlet and the outlet; and
   a dehumidifier movable between a first position in which the dehumidifier is within the blower case between the inlet and the blower in a path of airflow entering the blower case through the inlet, and a second position in which the dehumidifier is outside of the blower case and not in the path of airflow entering the blower case through the inlet.

2. The blower assembly of claim 1, wherein the blower is configured to draw airflow in through the inlet from a passenger cabin of a vehicle and recirculate the airflow back to the passenger cabin.

3. The blower assembly of claim 1, wherein the dehumidifier includes a desiccant.

4. The blower assembly of claim 1, wherein the dehumidifier dehumidifies airflow from a passenger cabin passing through the dehumidifier.

5. The blower assembly of claim 1, wherein in the first position the dehumidifier is against the inlet such that airflow from the inlet passes through the dehumidifier.

6. The blower assembly of claim 5, wherein in the second position the dehumidifier is spaced apart from the inlet such that airflow from the inlet does not pass through the dehumidifier.

7. The blower assembly of claim 1, further comprising an actuator configured to move the dehumidifier between the first position and the second position.

8. The blower assembly of claim 7, wherein the actuator includes a servo that moves an actuation arm.

9. The blower assembly of claim 8, wherein the servo is configured to arrange the dehumidifier at the first position during a passenger cabin warm-up mode.

10. The blower assembly of claim 7, wherein the dehumidifier includes a desiccant; and
wherein the desiccant is housed within a container movable by the actuator.

11. The blower assembly of claim 7, wherein the dehumidifier includes a desiccant; and
wherein the desiccant is housed within a filter movable by the actuator.

12. A blower assembly for a heating, ventilation, and air conditioning (HVAC) system of a vehicle, the blower assembly comprising:
a blower case defining an inlet for recirculated airflow entering the blower case from a passenger cabin of the vehicle and an outlet for airflow exiting the blower case;
a blower within the blower case between the inlet and the outlet for drawing airflow into the blower case from the passenger cabin, and for recirculating airflow back to the passenger cabin through an outlet of the blower case;
an actuator; and
a dehumidifier movable by the actuator between a first position in which the dehumidifier is within the blower case between the inlet and the blower in a path of airflow entering the blower case through the inlet from the passenger cabin during a warm-up mode of the HVAC system for warming the passenger cabin of the vehicle at engine start, and a second position in which the dehumidifier is outside of the blower case and not in the path of airflow entering the blower case through the inlet when the HVAC system is not in the warm-up mode.

13. The blower assembly of claim 12, further comprising a linkage connecting the actuator to the dehumidifier.

14. The blower assembly of claim 12, wherein the actuator includes a servo.

15. The blower assembly of claim 12, wherein in the first position the dehumidifier dehumidifies airflow from the passenger cabin flowing through the dehumidifier.

16. The blower assembly of claim 12, wherein the dehumidifier includes a desiccant.

17. The blower assembly of claim 16, wherein the desiccant is housed in a container.

18. The blower assembly of claim 16, wherein the desiccant is within a filter.

19. The blower assembly of claim 16, wherein in the first position the desiccant is against the inlet such that airflow from the inlet passes through the dehumidifier.

20. The blower assembly of claim 19, wherein in the second position the desiccant is spaced apart from the inlet such that airflow from the inlet does not pass through the dehumidifier.

\* \* \* \* \*